Dec. 11, 1923.
1,477,294
R. F. STORY
ILLUMINATED NUMBER PLATE, REAR LAMP, AND SIGNAL APPARATUS
Filed Jan. 10, 1923
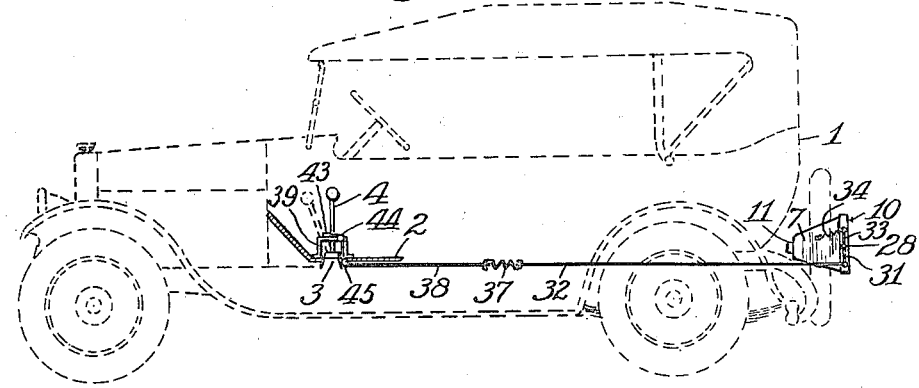
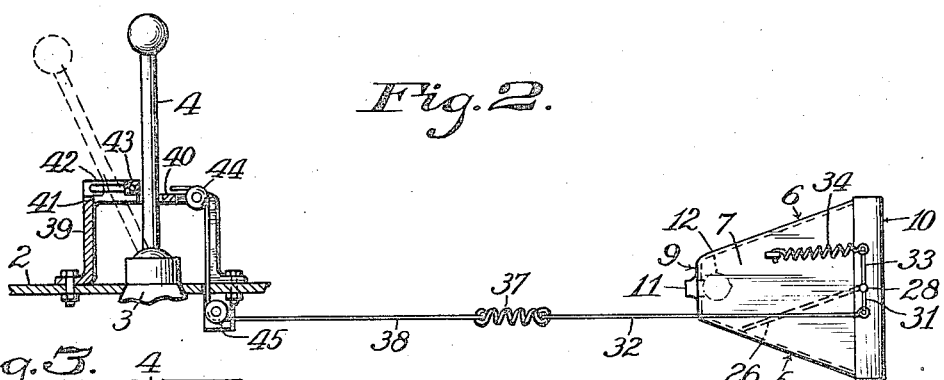
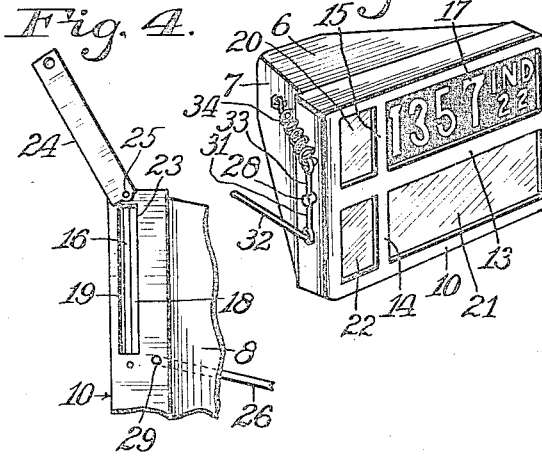
INVENTOR:
Ralph F. Story,
BY E. T. Silvius,
ATTORNEY.

Patented Dec. 11, 1923.

1,477,294

UNITED STATES PATENT OFFICE.

RALPH F. STORY, OF INDIANAPOLIS, INDIANA, ASSIGNOR OF ONE-HALF TO ADAM S. HORLACHER, OF INDIANAPOLIS, INDIANA.

ILLUMINATED NUMBER PLATE, REAR LAMP, AND SIGNAL APPARATUS.

Application filed January 10, 1923. Serial No. 611,736.

*To all whom it may concern:*

Be it known that I, RALPH F. STORY, a citizen of the United States, residing at Indianapolis, in the county of Marion and State of Indiana, have invented a new and useful Illuminated Number Plate, Rear Lamp, and Signal Apparatus, of which the following is a specification, reference being had to the accompanying drawings, and to the letters and figures of reference marked thereon.

This invention relates to apparatus whereby a signal or sign may be displayed and automatically changed as a result of operation of a controlling device, the invention having reference more particularly to apparatus for automobiles whereby a license number may be displayed in both day time and night time, and whereby a rear light and a signal light may be produced for the benefit of automobile drivers and others.

An object of the invention is to provide an improved illuminated number plate that shall be especially adapted for use on automobiles or motor vehicles and shall conveniently have a rear danger signal light connected therewith, which shall be so constructed as to not be costly, and shall be adapted to be used in various locations on a vehicle.

Another object is to provide an apparatus which shall be so constructed as to conveniently combine therein an illuminated number plate, a rear signal lamp, and a rear lamp to light the road when intending to run a motor vehicle backwards, while affording an intelligent signal to those rearward of the vehicle, all to be accomplished by the use of a single electric or other lamp.

A further object is to provide apparatus of the above-mentioned character which may be automatically controlled in harmony with the control of the motor vehicle, in order that a signal shall be reliably controlled without depending upon separate or special attention of the operator of the vehicle, and which shall be simple and reliable structurally and durable and economical in use.

With the above-mentioned and other objects in view, the invention consists in apparatus comprising a novel structure having different signal devices in a new and advantageous arrangement, and means for the automatic control thereof; the invention consisting further in the parts and combinations and arrangements of parts as hereinafter particularly described and further defined in the claims appended hereto.

Referring to the drawings,—Figure 1 is a side view of the apparatus involved in the invention arranged in connection with an automobile indicated by broken lines, the apparatus being illustrated as when adapted to be operated by means of the gear-shifting lever commonly used on automobiles whereby to control the change of speed and the direction of motion of the vehicle; Fig. 2 is a side elevation of the apparatus on an enlarged scale, controlling devices thereof being shown in sectional elevation approximately on the line II—II in the figure following; Fig. 3 is a top plan of suitable controlling devices shown in the preceding figure; Fig. 4 is a fragmentary side elevation of the casing of the signal apparatus, on an enlarged scale; Fig. 5 is a perspective view of the principal portions of the invention; and, Fig. 6 is a vertical central longitudinal section of the principal portions of the apparatus, on a further enlarged scale.

Similar reference characters in the various figures of the drawings indicate corresponding elements or features of the invention herein referred to in detail.

In the drawings, the numeral 1 indicates the body of a motor vehicle and 2 the floor thereof, 3 indicating the top of a well-known type of transmission gear casing, the transmission gear being shiftable and provided with a shifting lever 4, as will be understood. The speed changing gears may be variously controlled in different motor vehicles, the type commonly used requiring the gear shift lever to be moved in a path corresponding to the well-known H grid, the latter in some cases being invisible to the operator.

A practical embodiment of the invention comprises a suitable casing which may be variously constructed and as illustrated comprises a bottom 5, a top 6, sides 7 and 8, a rear wall 9 and a front frame 10. Preferably the rear wall 9 is considerably smaller in diameter than the front frame, the bottom and the top and the side walls being divergent from the rear wall and are suitably treated on their inner sides to constitute reflecting surfaces. The middle portion of the rear wall is provided with a suitable lamp socket 11 which suitably supports an electric lamp 12 adjacent to the inner side of the rear wall 9. Electric wiring for the lamp obviously necessary to conduct current is omitted.

The front frame 10 is rectangular and has a horizontal central bar 13 and two vertical bars 14 and 15 to provide two large openings, one above the other and two similarly arranged smaller openings. In the upper one of the larger openings an opaque license number plate 16 having cut-out numbers 17 is arranged together with two plates 18 and 19 on the opposite sides of the number plate, the inner plate 18 being composed of "frosted" glass so as to afford a substantially white background for the license number in day time and permitting light rays to pass through the cut-out numbers at night time. The outer plate 19 may be clear glass or a sheet of celluloid to protect the number plate from mud and dust. The upper one of the smaller spaces has a red glass or lens 20 therein for producing the required rear signal light when the license number is illuminated. The lower one of the larger openings or spaces in the front frame has a clear glass plate 21 therein through which light rays may pass to light the road, and at one end thereof the remaining smaller opening in the front frame has a red glass or lens 22 therein to afford a rear signal light when the vehicle is running or about to run backwards.

Suitable provision is made for conveniently changing the license number plate, usually yearly, one side of the casing having a vertical slot 23 therein through which the number plate may be removed and another inserted, a suitable protecting door 24 being provided to cover the slot, preferably being connected to the casing by means of a pivot 25 and may be provided with a suitable catch to hold it in closed position.

A horizontal adjustable partition 26 is arranged in the casing and provided with a hinge shaft 27 that has journals 28 and 29 rotatably supported in the sides of the casing behind the middle bar 13 of the front frame, suitable journal bearings 30 being preferably provided for the journals on the inner side of the casing, the partition extending a suitable distance rearwardly and being pivotally movable up or down to deflect the light rays from the lamp 12 as may be desired. One of the journals has an operating arm 31 fixed thereon to which a pull-rod or cable 32 is connected for swinging the partition upward, the partition descending by the force of gravity to contact with the bottom 5 of the casing. Preferably the pull-rod is spring-retracted, an arm 33 being fixed to one of the journals of the partition and having a coil spring 34 connected thereto that is suitably connected to the casing, thus tending to promptly lower the deflecting partition when the pull-rod is released. The pull-rod may be moved more or less as may be desired, so as to swing the partition 26 up to the top 6 of the casing to the oppositely inclined position 35, or to a mid-position 36. Preferably a coil spring 37 is connected to the pull-rod and has a cable 38 connected thereto to prevent straining of the connections when violently operated or inaccurately connected with an operating device.

A suitable stand 39 is secured upon the floor 2 of the motor vehicle and has a top plate 40, the plate shown being in the form of the H grid rather to illustrate the path of movement of the shifting lever 4, the top plate having a slot 41 therein into which the shifting lever is moved when setting the transmission gears for reversing or backward movement of the motor vehicle. A suitable guide 42 is arranged at the slot and guides a movable cross-head or lug device 43 to be engaged by the shifting lever when it is moved into the slot, and the cable 38 is connected to the cross-head so as to be operated thereby and is suitably guided, preferably by means of a guide sheave 44 arranged on the stand and a sheave 45 arranged under the floor 2.

It should be understood that the signal casing may be arranged in any desirable position and supported as may be desired; that the device for operating the partition 26 may be variously constructed and arranged; that the casing may have different shapes on different vehicles as may be preferred; that the front frame of the casing (which is rearward on the vehicle) may be variously designed as to contour and mechanical details; and that the springs 34 and 37 may in some cases be omitted or may be located in various positions.

In practical use, the motor vehicle gear shift lever 4 may be operated as usual for forward motion control, and may be set in neutral position, without interfering with the signal apparatus, the partition 26 normally remaining in connection with the bottom 5 of the casing and preventing rays of light from passing through the transparent plate or panel 21. In day time the license number and name that may be associated therewith plainly appears as white on a black or dark background. In the night time electric current having been turned or switched to the lamp 12, the number plate becomes illuminated and the lens 20 causes a red light to appear, no light being seen through the plates 21 and 22. When the motor vehicle has been stopped and it is to be run backward the shifting lever 4 is moved so as to properly shift the transmission gears for reverse movement, the lever being moved forward in the present case; and as the lever is moved forward it engages the cross-head or lug device 43 and moves it forward which causes the operation of the controlling connections, the latter causing the partition or shutter 26 to be moved pivotally into contact with the top 6 of the casing, in which position the light from the lamp is shut off from the number plate and the signal plate 20, the partition deflecting the light downward through the transparent plate 21 and the red light plate 22, the light being reflected by the walls of the casing and resulting in a strong light being projected downwardly and laterally on the road to enable the operator to properly steer the vehicle, such light being also a signal to those in the rear of the vehicle.

In some cases it may be desired that the number plate be illuminated when running the vehicle backwards, in which case the controlling device will be suitably designed or adjusted to cause the partition 26 to be swung upward to the horizontal position 36 instead of the position 35, thereby permitting rays from the lamp 12 to pass both below and above the partition. When the shifting lever 4 is returned from reverse position the operating and controlling connections of the signal apparatus are automatically retracted and the partition 26 returned to normal position in contact with the bottom 5 of the casing.

What I claim as new is:—

1. Illuminated number plate and signal apparatus including a casing having a transparent number and a light-opening below the number at one end of the casing, a lamp in the casing at the opposite end thereof, and means for periodically closing the light-opening to rays of light from the lamp.

2. Illuminated number plate and signal apparatus including a casing, a single lamp in the casing at one end thereof, a transparent number plate in the upper portion and a light-opening in the lower portion of the opposite end of the casing, and a deflecting partition pivoted in the casing to periodically close the light-opening in the lower portion of the casing.

3. Illuminated number plate and signal apparatus including a casing having a partition therein pivoted horizontally at one end thereof to swing upward or downward, a lamp in the casing at the opposite end thereof, a number plate with transparent numerals supported in the casing above the plane of the pivoted portion of the partition, a signal lens supported by the casing below the partition, and means to control the partition.

4. Illuminated number plate and signal apparatus including a casing having a number plate in the upper portion of one end thereof and a transparent plate in the lower portion of the end below the number plate, a lamp in the casing at the opposite end thereof, a partition pivoted horizontally in the casing adjacent to the bottom of the number plate and the top of the transparent plate, and means to control the partition.

5. Illuminated number plate and signal apparatus for a motor vehicle having a gear shift lever including a casing having a transparent number and a light-opening at one end thereof, a lamp in the casing at the opposite end thereof, a partition pivoted in the casing on a horizontal plane between the number and the light-opening to normally close the latter and deflect rays from the lamp to the transparent number, and means connected with the gear shift lever of the vehicle for automatically operating said partition.

6. Illuminated number plate and signal apparatus including a casing having a transparent number and a light-opening below the number, the casing having also a signal lens at one end of the number and a signal lens at one end of the light-opening, a lamp in the casing to project light rays to the transparent number and the signal lens at the end thereof and to the light-opening and the signal lens at the end thereof, and means for periodically intercepting the light rays between the lamp and the light-opening and the lens at the end thereof.

7. Illuminated number plate and signal apparatus comprising a casing having a front frame on one end thereof, the frame having a transparent number and a signal lens in the upper portion thereof and a transparent plate and a signal lens in the lower portion thereof, a lamp in the casing at the opposite end thereof, a partition pivoted in the casing on a horizontal plane between the bottom of the number and the top of the transparent plate and provided with an operating-arm, the partition being pivotally movable between the lamp and the transparent plate and the lens at the end thereof, or between the lamp and the transparent number and the lens at the end thereof, and means for controlling the operating-arm.

8. In an illuminated number plate, rear lamp and signal apparatus for motor-vehicles, the combination with a vehicle body, and a movable gear-shift lever carried by the body, of a casing mounted on the vehicle body and provided at the upper portion of one end thereof with a transparent number plate and also a signal lens and at the lower portion of said end with a transparent plate and also a signal lens, the casing having a door to receive the number plate, a lamp in the casing at the opposite end thereof, a partition in the casing pivoted horizontally adjacent to the lower portion of the number plate and the upper one of the lenses to swing past the lamp, one of the pivots of the partition having a downward-extending arm and an upward extending arm fixed thereon outside the casing, a pull-rod connected to said downward-extending arm, a control device movably supported to be engaged and moved by said gear-shift lever and having connection with the pull-rod, and a retracting-spring connected to said upward-extending arm and to the casing.

In testimony whereof, I affix my signature on the 28th day of December, 1922.

RALPH F. STORY.